C. A. PSILANDER.
DYNAMO ELECTRIC MACHINE.
APPLICATION FILED JAN. 16, 1906.

1,013,216.

Patented Jan. 2, 1912.
3 SHEETS—SHEET 1.

WITNESSES:
C. L. Belcher
Otto S. Schairer

INVENTOR
Charles A. Psilander
BY
Wesley G. Carr
ATTORNEY

C. A. PSILANDER.
DYNAMO ELECTRIC MACHINE.
APPLICATION FILED JAN. 16, 1906.

1,013,216.

Patented Jan. 2, 1912.

3 SHEETS—SHEET 2.

WITNESSES:
C. L. Belcher
Otto S. Schairer

INVENTOR
Charles A. Psilander
BY
ATTORNEY

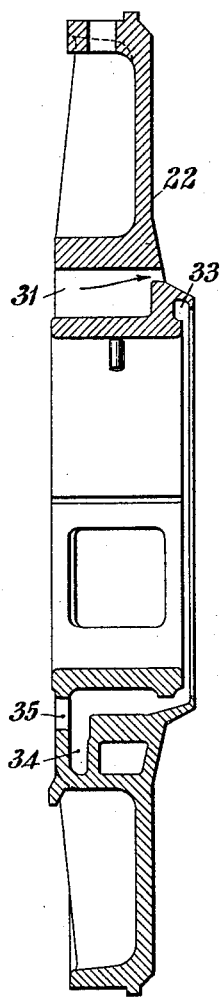

UNITED STATES PATENT OFFICE.

CHARLES A. PSILANDER, OF PITTSBURGH, PENNSYLVANIA, ASSIGNOR TO WESTINGHOUSE ELECTRIC & MANUFACTURING COMPANY, A CORPORATION OF PENNSYLVANIA.

DYNAMO-ELECTRIC MACHINE.

1,013,216.      Specification of Letters Patent.      Patented Jan. 2, 1912.

Application filed January 16, 1906. Serial No. 296,330.

*To all whom it may concern:*

Be it known that I, CHARLES A. PSILANDER, a citizen of the United States, and a resident of Pittsburgh, in the county of Allegheny and State of Pennsylvania, have invented a new and useful Improvement in Dynamo-Electric Machines, of which the following is a specification.

My invention relates to dynamo-electric machines and particularly to motors that are employed for the propulsion of electric railway vehicles.

The object of my invention is to provide a novel and improved structure for such machines whereby ventilation thereof may be readily effected.

Figure 1:
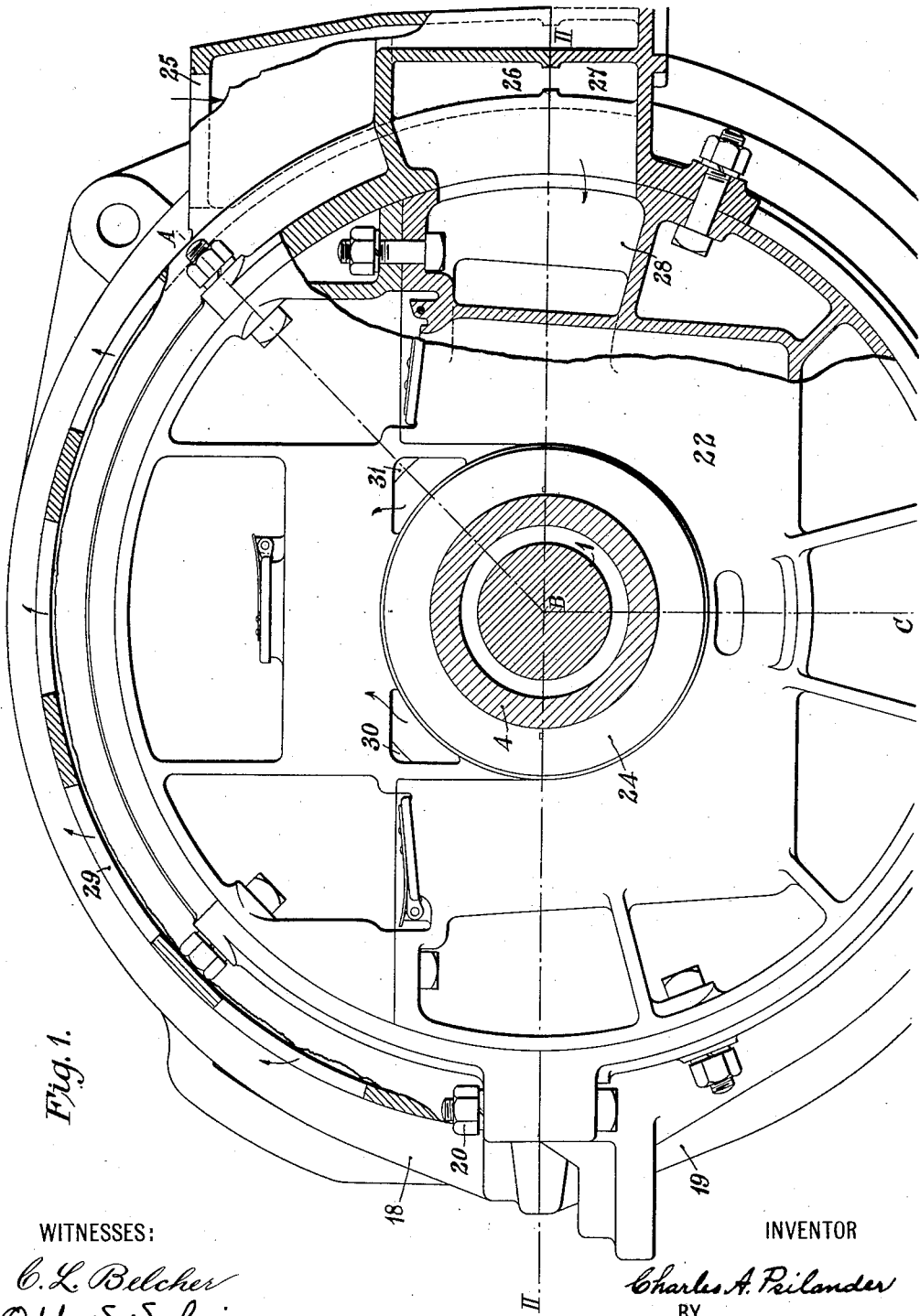
Figure 2:
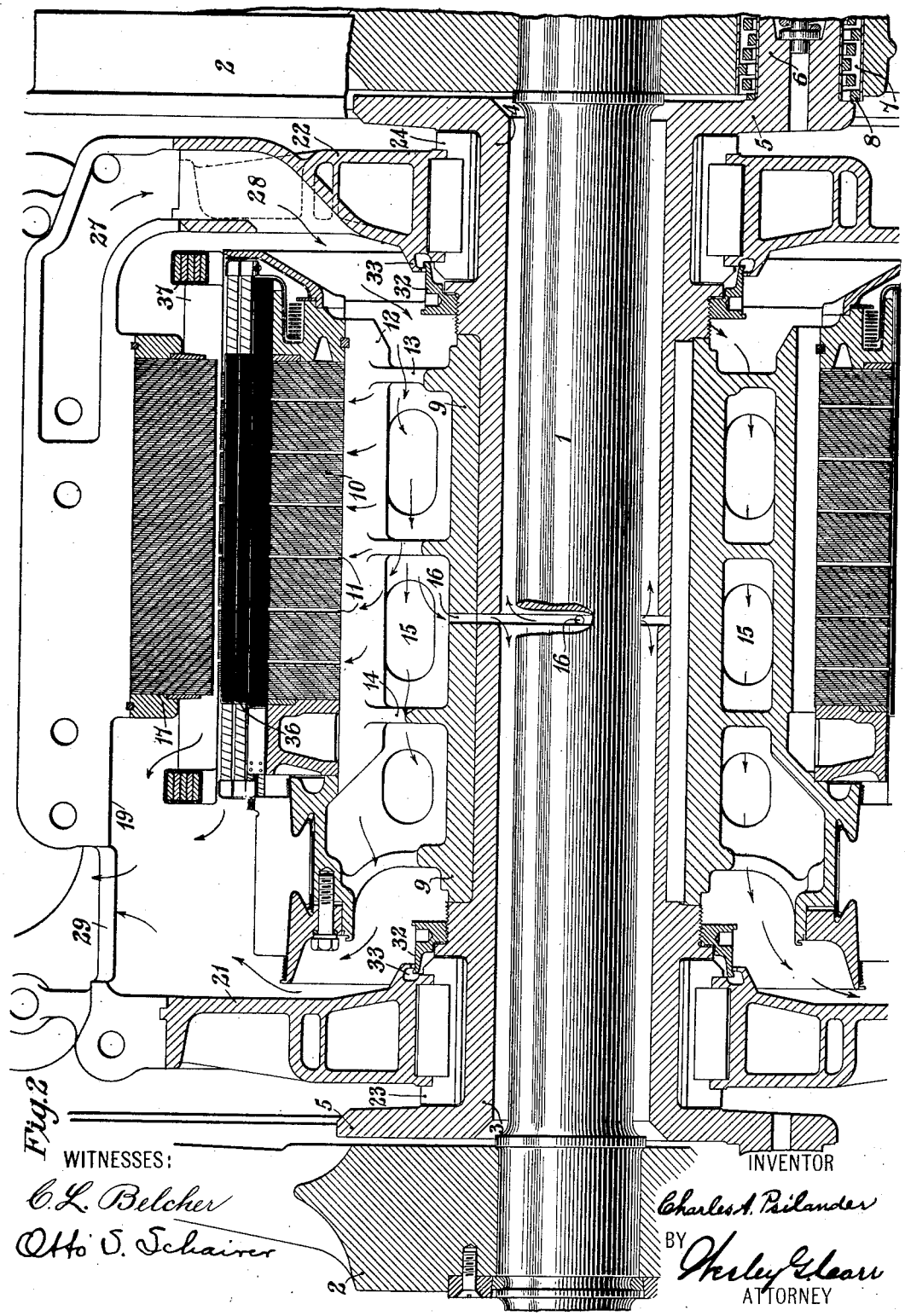

Figure 1 of the accompanying drawings is a view, in end elevation, of a portion of an electric railway motor embodying my invention, part of the structure being broken away. Fig. 2 is a view, in section, on line II—II of Fig. 1, of a part of the motor shown therein, and Fig. 3 is a sectional view, on the line A—B—C of Fig. 1, of a part of the structure shown therein.

An axle 1, that may be the axle of an electric locomotive or other vehicle upon the ends of which driving wheels 2 are mounted, is surrounded by a quill or sleeve comprising two parts 3 and 4 the outer ends of which are provided with either flanges or radial arms 5 having bosses 6 that project into corresponding chambers 7 in the driving wheels, the bosses being surrounded, within the chambers, by resilient means, such as springs 8. The inner, smaller ends of the quill sections are inserted into opposite ends of a cylindrical portion 9 of a supporting structure for a laminated armature core 10 having ventilating spaces 11 between certain of the laminæ, the supporting structure comprising also a set of longitudinal ribs 12 upon which the laminated core is directly supported and webbed radial arms 13 between which longitudinal passages 14 and circumferential passages 15 are provided for ventilating purposes. Apertures 16 in the cylindrical portion 9 provide communicating passages between the passages 14 and 15 in the armature structure and the interior of the quill.

A field magnet core 17 is supported by and inclosed within a structure or frame comprising two sections 18 and 19 that may be secured together by means of bolts 20. The frame is carried upon removable end brackets 21 and 22 that contain housings for bearings 23 and 24, respectively, whereby the field structure is mounted upon the quill in such manner as to permit of relative rotation between it and the armature. The upper section 18 of the field magnet frame is provided with a downwardly extending inlet port 25 that may communicate with any suitable source of air-pressure (not shown) and that is continued by means of longitudinal communicating recesses or channels 26 and 27 formed, respectively, in the adjoining edges of the upper and lower sections 18 and 19 of the field magnet frame. The end bracket 22 is provided with a passage 28 that communicates, at one end, with the passage formed by the recesses 26 and 27 and that opens, at its other end, into the chamber which contains the armature and the field magnets, the discharge end of the passage 28 being so shaped as to direct the currents of air into one end of the supporting structure for the armature.

Conveniently spaced openings or exhaust ports 29 are provided in the field magnet frame and other ports 30 and 31 are provided in the end brackets of the housings for the bearings. As is usual in machines of this class, flanges 32 are placed upon the quill sections, between the bearing and the remainder of the rotatable structure, from the flared edges of which oil, that creeps from the bearings along the quill, is thrown into corresponding annular recesses 33 in the inner faces of the end brackets 21 and 22. The oil is conducted, by means of these annular recesses, into chambers 34, in the lower parts of the housings, where it is collected, any excess overflowing to the exterior through openings 35. In the present instance, the openings 35 serve also as exhaust ports.

In the operation of my invention, air will be forced into the inlet port 25, through the passage formed by the recesses 26 and 27, in the respective sections of the field magnet frame and the passage 28 in the end bracket 22, and be discharged into the chamber containing the armature and the field magnets. A portion of the air that is directed into the longitudinal passages 14 in the armature-supporting structure is deflected through the ventilating spaces 11 in the armature core and circulates about armature windings 36 and field magnet windings 37. The air escapes from the inclosed chamber through the exhaust ports 29 in the field frame, through the passages 30 and 31 in the end brackets and through the apertures 16 in the supporting structure for the armature core, all as indicated by arrows.

It will be observed that, not only is the motor structure proper thoroughly ventilated, but drafts of air are also directed through the bearing housings and the quill structure, thereby avoiding dead air spaces, which might serve as heat insulators. The temperature of the bearings also is, in this manner, prevented from exceeding a predetermined degree.

I claim as my invention:

1. In a dynamo-electric machine comprising field magnet and armature cores, the combination with an inclosing casing that supports the field magnet core and is provided with an inlet port and with a plurality of peripheral exhaust ports, of end brackets for the field magnet casing that serve to support the field magnet bearings and are provided with exhaust ports and one of which is provided with a passage that communicates with the inlet port and discharges into the casing.

2. The combination with an axle, and a surrounding sleeve or quill having an internal diameter that is materially greater than the external diameter of the axle, of a dynamo-electric machine mounted upon the sleeve or quill and comprising field magnet and armature cores and coils, an inclosing casing having an inlet port at one end and a plurality of peripheral exhaust ports, and an armature core support having exhaust ports opening into the sleeve or quill.

3. The combination with an axle, and a surrounding sleeve or quill having an internal diameter that is materially greater than the external diameter of the axle, of a dynamo-electric machine mounted upon the sleeve or quill and comprising field magnet and armature cores and coils, an inclosing casing having an inlet port at one end and peripheral exhaust ports, and an armature support having additional exhaust ports that open into the sleeve or quill.

4. The combination with an axle and a two-part sleeve or quill surrounding the axle, of a dynamo-electric machine mounted upon the sleeve and comprising field magnet and armature cores, an inclosing casing, and a supporting structure for the armature core, inlet ports being provided through the inclosing casing and outlet ports being provided in the supporting structure for the armature core to discharge into the interior of the quill between the ends of the two parts thereof.

5. The combination with truck wheels and their axle, of a quill loosely surrounding the axle, a field magnet structure having an inlet port and a plurality of peripheral exhaust ports and an armature structure having ventilating passages and ports opening into the space between the quill and the axle through which exhaust is effected.

6. In a dynamo-electric machine comprising field magnet and armature cores, the combination with a two-part inclosing casing that supports the field magnet core and has inlet and exhaust ports and a passage that communicates with the inlet port and is formed by channels in the adjoining edges of the two parts of the inclosing casing, of a bracket that supports a field magnet bearing and is provided with a passage which communicates with the passage in the inclosing casing and discharges into the interior of the casing.

In testimony whereof, I have hereunto subscribed my name this 10th day of January, 1906.

CHAS. A. PSILANDER.

Witnesses:
 EDVIN TIDLUND,
 BIRNEY HINES.

---

Copies of this patent may be obtained for five cents each, by addressing the "Commissioner of Patents, Washington, D. C."